United States Patent [19]

Burkhardt

[11] Patent Number: 4,855,472

[45] Date of Patent: Aug. 8, 1989

[54] PROCESS FOR CHAIN STABILIZATION OF ORGANOPOLYSILOXANES

[75] Inventor: Jürgen Burkhardt, Winhöring, Fed. Rep. of Germany

[73] Assignee: Wacker-Chemie GmbH, Munich, Fed. Rep. of Germany

[21] Appl. No.: 64,026

[22] Filed: Jun. 19, 1987

[30] Foreign Application Priority Data

Jul. 30, 1986 [DE] Fed. Rep. of Germany ....... 3625688

[51] Int. Cl.$^4$ ............................. C07F 7/08; C07F 7/18
[52] U.S. Cl. ................................... 556/459; 556/450; 556/453; 556/456
[58] Field of Search ................. 556/459, 450, 453, 456

[56] References Cited

U.S. PATENT DOCUMENTS

| | | | |
|---|---|---|---|
| 3,269,981 | 8/1966 | Goossens | 556/459 X |
| 3,956,166 | 5/1976 | Lewis | 556/459 X |
| 4,071,498 | 1/1978 | Frye et al. | 556/459 X |
| 4,694,040 | 9/1987 | Hashimoto et al. | 556/459 X |

FOREIGN PATENT DOCUMENTS 2230376 12/1974 France .................................. 556/459

OTHER PUBLICATIONS

Noll, "Chemistry and Technology of Silicones", Academic Press, N.Y. (1968) pp. 192–196 and 209–212.

Primary Examiner—Paul F. Shaver

[57] ABSTRACT

Oligomeric siloxanol mixtures containing siloxanols of the formula $$HO-SiR_2O[SiR_2O-]_nH$$

and those of the formula $$R_3SiO-[SiR_2O-]_mH$$

where R represents the same or different monovalent hydrocarbon radicals, monovalent halogenated hydrocarbon radicals having from 1 to 18 carbon atoms or hydrogen atoms and n and m are the same or different integers are prepared by hydrolyzing a mixture containing at least one compound of the formula $R_3SiCl$ and at least one compound of the formula $R_2SiCl_2$. These oligomeric siloxanol mixtures can be reacted with the terminal Si-bonded hydroxyl groups of α, ω-dihydroxypolyorganosiloxanes.

4 Claims, No Drawings

PROCESS FOR CHAIN STABILIZATION OF ORGANOPOLYSILOXANES

The present invention relates to the preparation of certain oligomeric siloxanol mixtures and to a process for blocking the terminal hydroxyl groups and changing the molecular weight of organopolysiloxanes having hydroxyl groups in the terminal units, using these oligomeric siloxanol mixtures.

BACKGROUND OF THE INVENTION

Blocking of the terminal hydroxyl groups and changing the molecular weight of polyorganosiloxanes having one hydroxyl group in each of the terminal units is well known in the art. For example, U.S. Pat. No. 4,203,913 to Burkhardt et al. describes a process in which $\alpha,\omega$-dihydroxypolydiorganosiloxanes are reacted with $\alpha,\omega$-bis-trimethylsiloxypolydiorganosiloxanes in the presence of phosphonitrile chlorides. Also, German Offenlegungsschrift No. 3,524,484 (J. Burkhardt, Wacker-Chemie GmbH), describes a method for replacing terminal hydroxyl groups of $\alpha,\omega$-dihydroxypolyorganosiloxanes by reacting the $\alpha,\omega$-dihydroxypolyorganosiloxanes with hexaorganodisilazane in the presence of phosphonitrile chlorides.

Therefore, is an object of the present invention to provide a process for blocking the terminal hydroxyl groups of polyorganosiloxanes ($\alpha,\omega$-dihydroxypolyorganosiloxanes) having hydroxyl groups in the terminal units. Another object of the present invention is to provide a process for blocking the terminal hydroxyl groups of the polyorganosiloxanes with a composition having a low volatility at the pressures and temperatures employed in the blocking reaction. Still another object of the present invention is to provide a process for blocking the hydroxyl groups and changing the molecular weight of $\alpha,\omega$-dihydroxypolyorganosiloxanes. A further object of the present invention is to provide a process for blocking the hydroxyl groups and changing the molecular weight of $\alpha,\omega$-dihydroxypolyorganosiloxanes which makes it possible to use less catalyst at a comparable space-time yield. A still further object of the present invention is to provide a process for blocking the hydroxyl groups and changing the molecular weight of $\alpha,\omega$-dihydroxypolyorganosiloxanes which suppresses the formation of cyclic organosiloxanes and reduces the amount of catalyst-deactivating agent.

SUMMARY OF THE INVENTION

The foregoing objects and others which will become apparent from the following description are accomplished in accordance with this invention, generally speaking, by providing a process for chain stabilizing organopolysiloxanes which comprises reacting polyorganosiloxanes having terminal Si-bonded hydroxyl groups with mixtures of oligomeric siloxanols containing siloxanols of the formula $$HO-SiR_2O-[-SiR_2O-]_nH \qquad (I)$$

and those of the formula $$R_3SiO-[-SiR_2O-]_mH \qquad (II)$$

where each R represents the same or different monovalent hydrocarbon radicals, halogenated monovalent hydrocarbon radicals having from 1 to 18 carbon atoms, or hydrogen atoms and n and m are each the same or different integers, preferably having an average value of from 4 to 30, and more preferably from 6 to 15. These oligomeric siloxanol mixtures can be prepared by reacting a mixture of at least one compound of the formula $R_3SiCl$ and at least one compound of the formula $R_2SiCl_2$ with water, then separating the aqueous phase and then removing from the mixture low-boiling by-products at a temperature of from 100° up to 140° C. and under a pressure of from 5 to 15 hPa. The resultant mixture has a viscosity of from 10 to 80 $mm^2s^{-1}$ at 25° C.

DESCRIPTION OF THE INVENTION

In the mixture of oligomeric siloxanols, the hydrocarbon radicals represented by R in formulas (I) and II) having from 1 to 18 carbon atoms, that is, the organic radicals in the organosiloxanol mixtures which can be used in the process of this invention, are alkyl radicals, such as the methyl, ethyl, n-propyl, isopropyl, n-butyl and sec-butyl and octadecyl radicals; aliphatic radicals having a carbon-carbon double bond, such as the vinyl and allyl radicals; aryl radicals such as the phenyl and xenyl radicals; alkaryl radicals such as the tolyl radicals; and aralkyl radicals such as the benzyl radical.

Examples of halogenated hydrocarbon radicals represented by R in formulas (I) and (II) are halogenoalkyl radicals such as the 3,3,3-trifluoropropyl radical, and halogenoaryl radicals such as o-, p- and m-chlorophenyl radicals.

The preferred radicals represented by R are hydrogen atoms and hydrocarbon radicals which may be halogenated and have from 1 to 10 carbon atoms; alkyl and alkenyl radicals having from 1 to 3 carbon atoms, and phenyl radicals. More preferably the R radicals are hydrogen atoms, methyl and vinyl radicals.

The oligomeric organosiloxanol mixtures which contain compounds of formulas (I) and (II), are prepared by reacting compounds of the formulas $R_3SiCl$ (III) and $R_2SiCl_2$ (IV) with water. Preferably, the compounds employed are in a molar ratio of (III):(IV) of from 1:10 to 1:100, and more preferably from 1:15 to 1:50.

The volume ratio of the silane mixture of the compounds of formulas (III) and (IV) to water used in the process of this invention is preferably from 1:3 to 1:20, and more preferably from 1:5 to 1:10. The silane mixture containing compounds of formulas (III) and (IV) is preferably reacted with the water at temperatures from 10° to 80° C., and more preferably from 20° C. to 60° C. The hydrolysis can be carried out at ambient atmospheric pressure, that is, at about 0.101 mPa (absolute); however, it can also be carried out at higher or lower pressures.

After the hydrolysis reaction has occurred, a mixture is obtained which consists of an aqueous phase containing hydrochloric acid and an organosiloxane phase, which also contains, in addition to compounds of formulas (I) and (II), those of formula (V):

$$R_3SiO-[-SiR_2O]_oSiR_3 \qquad (V)$$

wherein o can have the same value as n or m, and cyclic siloxanes. The aqueous phase containing hydrochloric acid is then preferably separated from the organosiloxane phase, for example, in a horizontal cylinder filled with glass or mineral wool (coalescer). The isolated organosiloxane phase then contains only a small amount of HCl. Although this is generally unnecessary, the HCl content can be reduced by washing with water and repeating the phase separation. The by-products, that is, the cyclic siloxanes and compounds of formula (V), which in most cases are more volatile, are then separated from the organosiloxane phase by distillation, preferably at pressures of from 5 hPa (absolute) to about 15 hPa (absolute) and at temperatures up to about 140° C. In this manner, the mixture of oligomeric siloxanols obtained in accordance with this invention, contains compounds of formula (I) and those of formula (II), as determined by $^{29}$Si-NMR measurements on these mixtures. Thus, the ratio of the areas under the resonance signals of the HO—SiR$_2$O groups and the R$_3$SiO groups is greater than 1; for the mixtures prepared or used in the examples which follow, this ratio assumes values between 2 and 3. This area ratio can be used for estimating the proportion of the components consisting of formula (I) and formula (II) in the mixture of components of formulas (I) and (II), by equating the average values of m and n in these formulas. Thus, an area ratio of the signals of the HO—SiR$_2$O groups and those of the R$_3$SiO groups of 2 or 3 results, respectively, in a proportion of components of formula (I) of one third or half of the total number of molecules of the formulas (I) and (II).

The viscosity of the mixture prepared in accordance with the present invention is preferably from 15 mm$^2$s$^{-1}$ to 60 mm$^2$s$^{-1}$, and more preferably from 20 mm$^2$s$^{-1}$ to 30 mm$^2$s$^{-1}$ at 25° C.; the Si-bonded hydroxyl groups are preferably present in an amount of from 1 to 4.5 percent by weight, and more preferably from 2 to 3.5 percent by weight, based on the total weight of compounds having the formulas (I) and (II).

The oligomeric organosiloxanol mixtures can be prepared batchwise or as a semi-continuous process or as a continuous process. The continuous process is preferred, because loop reactors such as those described, for example, in U.S. Pat. No. 3,939,195 may be used.

Preferred components of the oligomeric organosiloxanol mixtures, which can be prepared in accordance with this invention and used according to this invention for blocking the terminal hydroxyl groups of polyorganosiloxanes, are those having formulas (I) and (II), in which 80 percent of the R radicals are methyl radicals. Examples of preferred compounds of formulas (I) and (II) are:

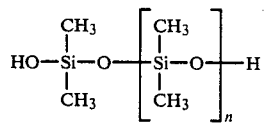
(VI)

and

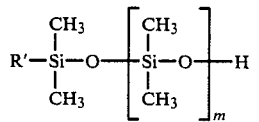
(VII)

where n and m are the same as above in formulas (I) and (II) and R' represents a hydrogen atom, a methyl group or a vinyl group, and more preferably a methyl or vinyl group.

The oligomeric organosiloxanol mixtures of this invention, which contain compounds of formulas (I) and (II) or (VI) and (VII), are reacted in the process of this invention with organopolysiloxanes having Si-bonded hydroxyl groups in the terminal units, in order to block the hydroxyl groups.

Under the conditions, which compounds of formulas (I) and (II) are reacted with the organopolysiloxanes having terminal hydroxyl groups, the organopolysiloxanes can also react with themselves, either with cleavage of siloxane bonds or with formation of such bonds by condensation of two silanol groups. This reaction or these reactions, termed condensation and/or equilibration, can lead to considerable changes, especially in increases in the molecular weight and hence also of the viscosity of the organopolysiloxanes used in the process of this invention. The process of this invention will have the greatest industrial importance in the reaction of relatively low-viscosity organopolysiloxanes having hydroxyl groups in the terminal units with compounds having formulas (I) and (II), in which the resultant organopolysiloxanes obtained have a substantially greater viscosity than those initially employed. These organopolysiloxanes having triorganosiloxy groups in the terminal units preferably have a viscosity of from 5 Pa.s to 50,000 Pa.s, and more preferably from 10 Pa.s to 20,000 Pa.s at 25° C.

Examples of organopolysiloxanes, which can be used in the process of this invention, are linear organopolysiloxanes having one hydroxyl group in each of its terminal units, such as those of the formula

(VIII)

where R" represents the same or different monovalent hydrocarbon radicals, or monovalent halogenated hydrocarbon radicals or hydrogen, with the proviso that each silicon atom, to which hydrogen is directly bonded, is also bonded to a hydrocarbon radical, and p represents an integer having a value of at least 2. Even though this is generally not shown in the above formula, up to a total of about 5 mol percent of the units of the formula SiR"$_2$O can be replaced by other siloxane units. Examples of other siloxane units which are generally present as impurities are those of the formula R"SiO$_{3/2}$, R"$_3$SiO$_{\frac{1}{2}}$, where R" is the same as above, or SiO$_{4/2}$ or mixtures of at least two of such units.

Preferably, the radicals represented by R" in formula (VIII) contain from 1 to 18 carbon atoms per radical. Examples of hydrocarbon radicals represented by R" in the organopolysiloxanes which can be employed in the process of this invention are alkyl radicals such as the methyl, ethyl, n-propyl, isopropyl, n-butyl and sec-butyl and octadecyl radicals; aliphatic radicals having a carbon-carbon double bond, such as the vinyl and allyl radicals; aryl radicals, such as the phenyl and xenyl radicals; alkaryl radicals such as the tolyl radicals and aralkyl radicals, such as the benzyl radical.

Examples of halogenated hydrocarbon radicals represented by R" in the organopolysiloxanes which can be employed in the process of this invention are halogenoalkyl radicals, such as the 3,3,3-trifluoropropyl radical, and halogenoaryl radicals, such as o-, p- and m-chlorophenyl radicals.

The process of this invention is probably of greatest importance where organopolysiloxanes are used containing one Si-bonded hydroxyl group in each of the terminal units, especially diorganopolysiloxanes in which all the organic radicals are methyl groups.

A catalyst can be used in the process of this invention to accelerate end-blocking of the terminal hydroxyl groups and altering the molecular weight of organopolysiloxanes, especially those of formula (VIII), using a mixture containing at least one of each of the compounds of formulas (I) and (II). Examples of suitable catalysts are, inter alia, the acids and bases described as condensation catalysts by W. Noll (Chemistry and Technology of Silicones, Academic Press, 1968, pages 212 and 221-229). Examples of acids are sulfuric acid, phosphoric acids, boric acid, ionic exchangers such as acid-activated bleaching earths, and phosphonitrile chlorides. Examples of bases are hydroxides, alkoxides and amides of the alkali metals, amines, quaternary ammonium and phosphonium salts, silanolates and many others.

The preferred catalysts used in the process of this invention are phosphonitrile chlorides. The phosphonitrile chlorides can be any of the phosphonitrile chlorides, with which it has been possible heretofore to promote the condensation of linear organopolysiloxanes containing one Si-bonded hydroxyl group in each of the terminal units. For example, the phosphonitrile chlorides can be prepared by reacting 400 parts by weight of phosphorus pentachloride with 130 parts by weight of ammonium chloride (See, for example, "Berichte der Deutschen Chemischen Gesellschaft", volume 57, 1924, page 1345), or they can be prepared by reacting 2 mols of phosphorus pentachloride with 1 mol of ammonium chloride (See, for example, U.S. Pat. No. 3,839,388, to S. Nitzsche et al.). Of course, mixtures of at least two different types of phosphonitrile chlorides can also be used.

Phosphonitrile chloride is preferably used in an amount of from about 0.1 to 40 ppm by weight, and more preferably from about 5 to 20 ppm by weight, based on the weight of the linear organopolysiloxanes containing one Si-bonded hydroxyl group in each terminal unit employed in the process of this invention.

The blocking of the hydroxyl groups and the change in the molecular weight of the linear organopolysiloxanes (condensation) having one Si-bonded hydroxyl group in each of the terminal units is preferably carried out at a temperature of from about 0° to 220° C., and more preferably at a temperature of from 100° to 180° C.

The condensation of linear organopolysiloxanes having one Si-bonded hydroxyl group in each of the terminal units is preferably carried out at a pressure below about 800 hPa (absolute), and more preferably below 10 hPa (absolute). In order to remove the water formed as a result of the condensation reaction, the condensation reaction may also be conducted at higher pressures.

The reaction of the oligomeric organosiloxanol mixture containing components of formulas (I) and (II) (endblocker) with the organopolysiloxanes having hydroxyl groups in the terminal units (dihydroxypolyorganosiloxane), preferably those of formula (VIII), is initiated by mixing the reactants together, preferably in the presence of catalyst(s), such as phosphonitrile chlorides. In general, these reactants can be mixed with one another in any desired order; however, preferably the catalyst, if used, is added after the endblocker and the dihydroxypolyorganosiloxane have been mixed.

The amount of endblocker employed can be varied within wide limits. The greater the amount of endblocker compared with the amount of dihydroxypolyorganosiloxane, the shorter the chain lengths of the polymer produced by the reaction. However, the amount of endblocker used is generally in the range of from about 0.1 percent by weight to about 20 percent by weight, and more preferably from about 0.2 percent by weight to about 10 percent by weight, based on the weight of the dihydroxypolyorganosiloxane employed.

When the reaction is complete, the catalyst, if used, is removed or deactivated. If phosphonitrile chlorides are used as the catalysts, these or their secondary products can be deactivated by means of n-butyllithium in accordance with the process described in U.S. Pat. No. 4,564,693 to Riederer.

The process of this invention can be carried out batchwise, semicontinuously or as a continuous process. Preferably, however, it is carried out as a continuous process.

Preferably, the process is conducted in reactors which permit continuous feeding of the reaction mixture under a reduced pressure. Examples of such reactors are screw kneaders, such as twin-screw kneaders and oscillating pilgrim-step kneaders (co-kneaders).

The organopolysiloxanes prepared in accordance with the process of the present invention have terminal units of the formulas

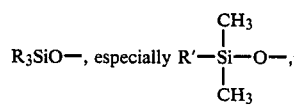

where R is the same as in formulas (I) and (II) and R' represents a methyl group, a vinyl group or a hydrogen atom.

The organopolysiloxanes prepared in accordance with this invention are those having trimethylsiloxy, vinyldimethylsiloxy and/or dimethyl-hydrogen-siloxy terminal groups. It is obvious to those skilled in the art that the organopolysiloxanes having two different terminal groups, such as, for example, α-trimethylsiloxy-ω-vinyldimethylsiloxypolydiorganosiloxanes, α-trimethylsiloxy-ω-dimethyl hydrogen siloxypolydiorganosiloxanes and α-vinyldimethylsiloxy-ω-dimethylhydrogen siloxypolydiorganosiloxanes, can also be prepared by the process of this invention. Likewise, a single type of α,ω-dihydroxypolyorganosiloxane can be reacted with a mixture of endblockers as well as mixtures of α,ω-dihydroxypolyorganosiloxanes, for example, those of formula (VIII), can be reacted with a single endblocker or a mixture of endblockers. Mixtures of formulas (VI) and (VI) are, for example, to be regarded as mixtures of endblockers in which the radical R' represents a vinyl group in one part of the compounds of the formula (VII) and a methyl group and/or hydrogen atom in the other part, and similar combinations which are obvious to those skilled in the art.

The dihydroxypolyorganosiloxanes employed in the process of this invention, especially those of formula (VIII), preferably have a viscosity of from 50 to 1,000 mPa.s, and more preferably from 100 to 300 mPa.s at 25° C.

The polymers thus obtained can be used, for example, in the preparation of elastomers. However, if the polymers are endblocked by trimethylsiloxy groups, then they may be used as slip agents for filaments.

The phosphonitrile chloride used in the following examples is prepared in the following manner:

A mixture containing 417 g (2 mol) of phosphorus pentachloride and 53.5 g (1 mol) of ammonium chloride in 1,000 milliliters of tetrachloroethane is heated under reflux for 12 hours. The volatile constituents are removed from the resulting, pale yellow solution at 160° while reducing the pressure to about 1.33 hPa (absolute). The residue contains yellow crystals which consist essentially of a compound of the formula $Cl_3PNPCl_2NPCL_3 \cdot PCl_6$.

Unless otherwise specified, the following examples are carried out at a pressure of 0.10 MPa (absolute) and at a temperature of from 20° to 25° C. In these examples, all parts are by volume unless otherwise specified.

(A) PREPARATION OF THE OLIGOMERIC SILOXANOL MIXTURE

Example 1

A mixture containing 20 parts of dimethyldichlorosilane and 1 part of trimethylchlorosilane [$(CH_3)_2SiCl_2:(CH_3)_3SiCl$ molar ratio 21:1] and 116 parts of water are fed continuously into a circulating reactor. The aqueous phase in the circulating reactor contains about 10 percent by weight of hydrogen chloride. The temperature in the reactor is 45° C., and the mean residence time of the reaction mixture in the reactor is 22 minutes. In a horizontal cylinder packed with glass wool, the aqueous phase containing hydrochloric acid is separated from the reaction mixture continuously flowing out of the reactor. The remaining organosiloxane phase, which contains less than 1 ppm by weight of hydrogen chloride, is freed of the lower boiling substances at 10 hPa (absolute) pressure and at a temperature up to about 140° C. A siloxanol mixture having a viscosity of 28 mm$^2$s$^{-1}$ at 25° C. and containing 3.0 percent by weight of Si-bonded hydroxyl groups is obtained.

Example 2

The procedure of Example 1 is repeated, except that a mixture containing 20 parts of dimethyldichlorosilane and one part of vinyldimethylchlorosilane [$(CH_3)_2SiCl_2:H_2C=CH(CH_3)_2SiCl$ molar ratio=23:1] are substituted for the mixture of dimethyldichlorosilane and trimethylchlorosilane. A siloxanol mixture having a viscosity of 26 mm$^2$s$^{-1}$ at 25° C. and containing 2.6 percent by weight of Si-bonded hydroxyl groups is obtained.

(B) BLOCKING OF THE TERMINAL HYDROXYL GROUPS AND ALTERING OF THE MOLECULAR WEIGHT OF THE ORGANOPOLYSILOXANES

Example 3

About 200 l/h of an α,ω-dihydroxypolydimethylsiloxane having a viscosity of 150 mm$^2$s$^{-1}$ at 25° C., 14 l/h of an oligomeric organosiloxanol mixture prepared from 16 parts of dimethyldichlorosilane and one part of trimethylchlorosilane and having a viscosity of 23$^2$s$^{-1}$ at 25° C. and containing 2.4 percent by weight of Si-bonded hydroxyl groups and 12 ppm by weight of phosphonitrile chloride, based on the weight of the α,ω-dihydroxypolydimethylsiloxane, dissolved in dichloromethane are fed continuously into a twin-screw kneader maintained at a temperature of 150° C. and at a pressure of 0.5 kPa. About 20 ppm of n-butyllithium as a 1 percent by weight solution in silicone oil are fed by means of a gear pump to the polymer which is at a temperature of about 150° C. at the discharge tube. An α,ω-bis-trimethylsiloxypolydimethylsiloxane having a viscosity of 12,000 mPa.s at 25° C. is obtained.

Example 4

The procedure of Example 3 is repeated, except that 240 l/h of the same α,ω-dihydroxypolydimethylsiloxane, 8 l/h of the same oligomeric organosiloxanol mixture and 15 ppm by weight of the same phosphonitrile chloride are fed into the twin-screw kneader. An α,ω-bis-trimethylsiloxypolydimethylsiloxane having a viscosity of 100,000 mPa.s at 25° C. is obtained.

Example 5

The procedure of Example 3 is repeated, except that 13 l/h of an oligomeric siloxanol mixture prepared from 20 parts of dimethyldichlorosilane and one part of vinyldimethylchlorosilane and having a viscosity of 22 mm$^2$s$^{-1}$ at 25° C. and containing 2.7 percent by weight of Si-bonded hydroxyl groups are fed into the twin-screw kneader. An α,ω-bis-vinyldimethylsiloxypolydimethylsiloxane having a viscosity of 20,000 mPa.s at 25° C. is obtained.

What is claimed is:

1. A process for preparing oligomeric siloxanol mixtures containing siloxanols of the formula $$HO-SiR_2O-[SiR_2O]-_nH \qquad (I)$$

and those of the formula $$R_3SiO-[SiR_2O]-_mH \qquad (II)$$

where R is selected from the group consisting of monovalent hydrocarbon radicals, halogenated monovalent hydrocarbon radicals having from 1 to 18 carbon atoms and hydrogen atoms, and n and m are each integers having an average value of from 4 to 30, which comprises reacting a mixture containing at least one compound of the formula $R_3SiCl$ and at least one compound of the formula $R_2SiCl_2$ with water in the absence of an organic solvent, removing the aqueous phase and distilling off the lower-boiling by-products at a temperature of from 100° to 140° C. under a pressure of from 5 to 15 hPa (absolute), to form a mixture having a viscosity of from 10 to 80 mm$^2$s$^{-1}$ at 25° C.

2. A process for blocking terminal hydroxyl groups and changing the molecular weight of organopolysiloxanes having hydroxyl groups in the terminal units, which comprises reacting the organopolysiloxanes having terminal Si-bonded hydroxyl groups with the oligomeric siloxanol mixtures prepared in accordance with the process of claim 1 to form organopolysiloxanes having terminal units of the formula $$R_3SiO$$

where R is selected from the group consisting of monovalent hydrocarbon radicals, halogenated monovalent hydrocarbon radicals having from 1 to 18 carbon atoms and hydrogen atoms.

3. The process of claim 2, wherein the reaction is carried out in the presence of an acid or basic catalyst.

4. The process of claim 3, wherein the acid catalyst is phosphonitrile chlorides.

* * * * *